(12) United States Patent
Hermann et al.

(10) Patent No.: US 7,979,177 B2
(45) Date of Patent: Jul. 12, 2011

(54) SYSTEM AND METHOD FOR UPDATING VEHICLE COMPUTING PLATFORM CONFIGURATION INFORMATION

(75) Inventors: Thomas Hermann, Troy, MI (US); Timothy P. Curtis, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 1107 days.

(21) Appl. No.: 11/742,091

(22) Filed: Apr. 30, 2007

(65) Prior Publication Data
US 2008/0269979 A1    Oct. 30, 2008

(51) Int. Cl.
*G06F 7/00* (2006.01)
(52) U.S. Cl. .......................................... 701/33; 701/49
(58) Field of Classification Search .................. 701/33, 701/49; 340/901
See application file for complete search history.

(56) References Cited

U.S. PATENT DOCUMENTS

| | | | |
|---|---|---|---|
| 6,445,084 B1 | 9/2002 | Daiss et al. | |
| 6,532,298 B1 | 3/2003 | Cambier et al. | |
| 6,549,115 B1 | 4/2003 | Daiss et al. | |
| 6,999,858 B2 | 2/2006 | Walker et al. | |
| 7,038,596 B2 | 5/2006 | Nakajima | |
| 7,685,162 B2 * | 3/2010 | Heider et al. | 707/802 |
| 2003/0078709 A1 * | 4/2003 | Yester et al. | 701/36 |
| 2004/0010358 A1 * | 1/2004 | Oesterling et al. | 701/49 |
| 2004/0158373 A1 * | 8/2004 | Nakaya | 701/35 |
| 2005/0237150 A1 * | 10/2005 | Sun et al. | 340/5.52 |
| 2006/0001523 A1 * | 1/2006 | Underdahl et al. | 340/5.64 |
| 2006/0049962 A1 | 3/2006 | Okada | |
| 2008/0077298 A1 * | 3/2008 | Hattori et al. | 701/49 |
| 2008/0228358 A1 * | 9/2008 | Wang et al. | 701/49 |
| 2008/0269979 A1 * | 10/2008 | Hermann et al. | 701/33 |
| 2009/0082928 A1 * | 3/2009 | Witkowski et al. | 701/49 |
| 2010/0161171 A1 * | 6/2010 | Valentine et al. | 701/33 |

* cited by examiner

*Primary Examiner* — Khoi Tran
*Assistant Examiner* — Brian J Broadhead
(74) *Attorney, Agent, or Firm* — Frank MacKenzie; Brooks Kushman P.C.

(57) ABSTRACT

A configurable vehicle computer is enabled based on identification information associated with a driver. Updates to the configurable vehicle computer are stored at a remote location. The updates are downloaded upon an authorized vehicle start-up.

18 Claims, 3 Drawing Sheets

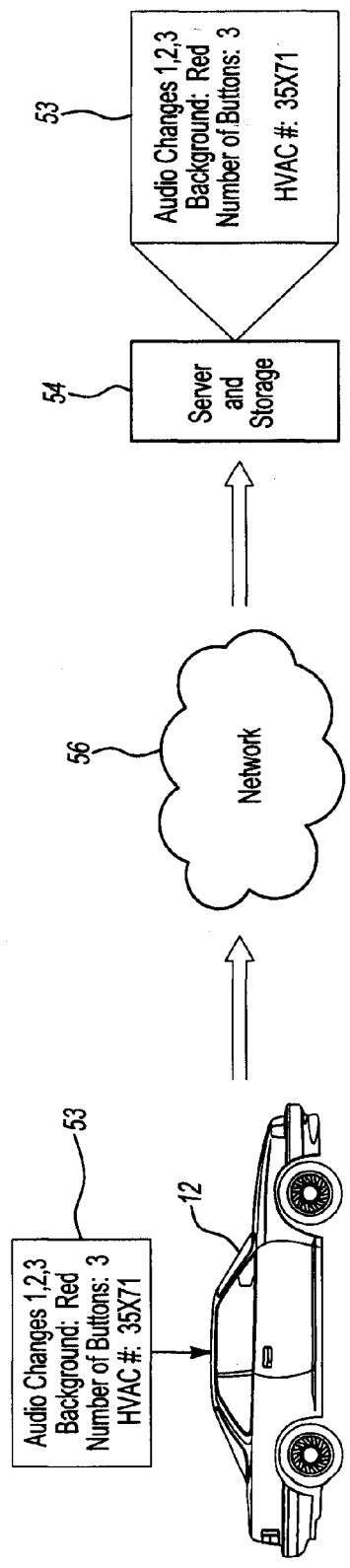
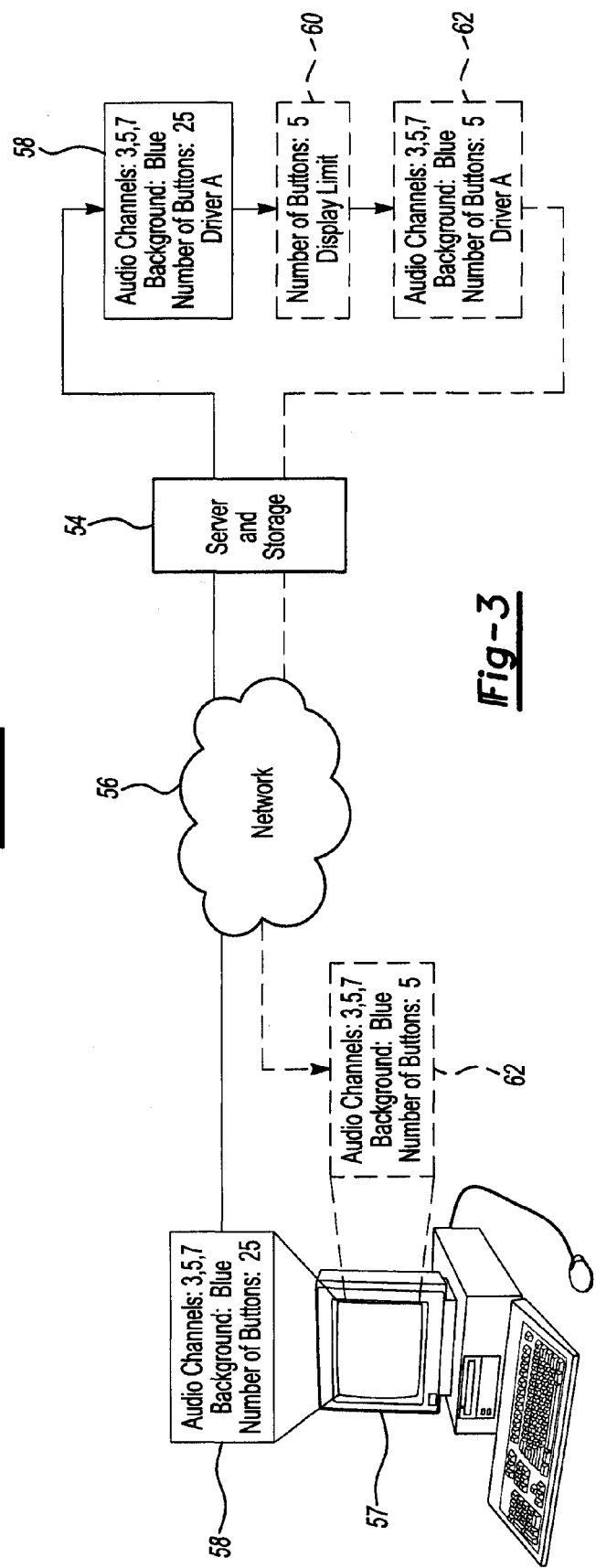
Fig-2
Fig-3

SYSTEM AND METHOD FOR UPDATING VEHICLE COMPUTING PLATFORM CONFIGURATION INFORMATION

BACKGROUND

1. Field of the Invention

The invention relates to systems and methods for updating vehicle computing platform configuration information.

2. Discussion

A vehicle may have a computer that communicates with the internet. Sensitive information may reside with the computer. Unauthorized use of the vehicle may lead to unauthorized access of the information.

SUMMARY

Embodiments of the invention may take the form of a system to update first configuration information of a computing platform of a vehicle. The system includes an information store configured to receive and store second configuration information and a token configured to supply identification information. The system also includes an identification module configured to receive the identification information and determine whether to enable the computing platform. The system further includes a communication module configured to establish a communication line between the computing platform and the information store if the computing platform is enabled and an update module configured to determine whether the first configuration information is different from the second configuration information and update the computing platform with the second configuration information.

Embodiments of the invention may take the form of a method for updating first configuration information of a computing platform of a vehicle. The method includes receiving second configuration information, determining whether the first configuration information is different from the second configuration information, and updating the computing platform with the second configuration information if the second configuration information is different from the first configuration information.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2 is an illustration of the vehicle, a network, and a remote server for storing configuration information and shows the vehicle communicating default configuration information to the remote server via the network.

FIG. 3 is an illustration of an update terminal, a network, and the remote server and shows updated configuration information being submitted to the remote server via the network, modified by the remote server in accordance with a policy, and returned to the update terminal via the network.

DETAILED DESCRIPTION

In some embodiments, a two level authentication system in which the second level is optional based on customer preference and level of security is provided. An immobilizer transponder, passive keyless entry transponder, or remote keyless entry transmitter may be used to authenticate the holder of a token as a valid user for the system. In addition, an optional pin code may be used for enhanced authentication. Keyboard entry of a pin number may be from radio preset selection buttons or other convenient buttons provided for this or other combined features. Such token/pin authentication enables the appropriate function, features, content, and data for a valid user.

Figure 1:
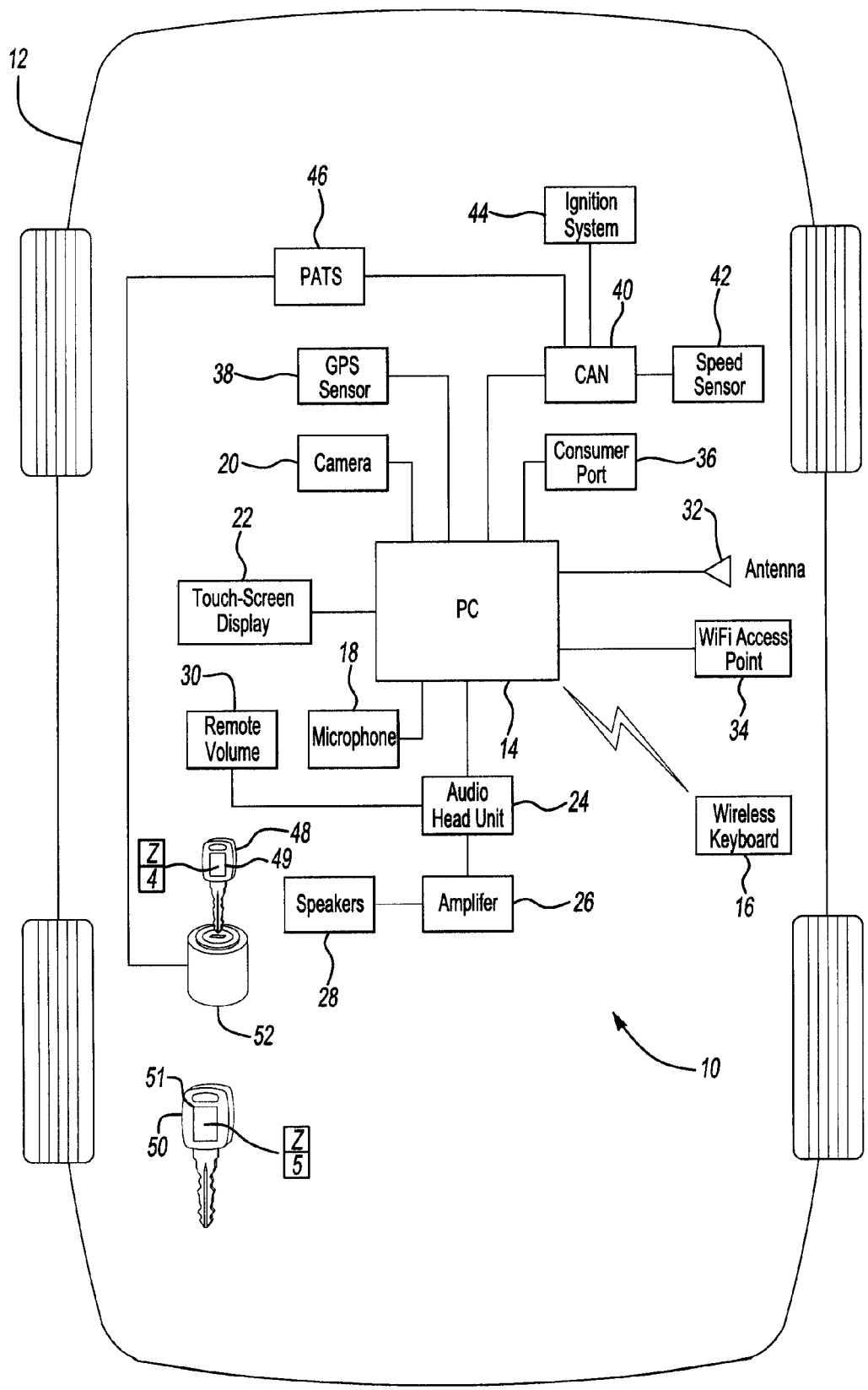
FIG. 1 is a block diagram of a computer system for a vehicle in accordance with an embodiment of the invention and shows the communicative relationship between a central processor, passive anti-theft system, and ignition system.

FIG. 1 is a block diagram of integrated system 10 of vehicle 12. Processor 14 provides an occupant of vehicle 12 with a common access point to various vehicle components and data. Processor 14 receives input from wireless keyboard 16, microphone 18, and camera 20. Processor 14 also receives input via display screen 22, e.g., touchscreen, and displays various information via display screen 22. Processor 14 is also connected with the sound system for vehicle 12. The sound system includes audio head unit 24, amplifier 26, and speakers 28. The volume of speakers 28 may be remotely controlled with remote volume switch 30. Processor 14 receives signals via antenna 32 and transmits and receives wireless data via transceiver 34.

Consumer port 36, e.g., USB port, permits an occupant to exchange information with vehicle 12. GPS sensor 38, together with processor 14, determines the current location of vehicle 12.

Car area network 40 is connected with processor 14, speed sensor 42, ignition system 44, and passive anti-theft system 46. Speed sensor 42 determines, in conventional fashion, the speed of vehicle 12. In alternative embodiments, some or all of the elements connected directly with processor 14 may be connected with car area network 40 and thus communicate with processor 14 via car area network 40.

Passive anti-theft system 46 prevents unauthorized use of vehicle 12 and processor 14. As described below, passive anti-theft system 46 may prevent ignition system 44 from starting vehicle 12 and may also prevent the operation of processor 14.

Keys 48, 50 include embedded identifying information 49, 51 respectively. Passive anti-theft system 46 uses identifying information 49, 51 to determine whether keys 48, 50 are associated with vehicle 12 and to distinguish between keys 48, 50.

If key 48 is inserted into key slot 52, key slot 52 senses identifying information 49. Identifying information 49 includes a vehicle identifier, e.g., "Z", that indicates key 48 is for use with vehicle 12. This vehicle identifier, e.g., "Z", is shared between keys 48, 50. That is, in this example, identifying information 51 of key 50 will also include the vehicle identifier "Z". On the basis of the vehicle identifier, passive anti-theft system 46 determines that key 48, or key 50, is for use with vehicle 12. Identifying information 49 also includes a driver identifier, e.g., "4", that indicates key 48 is different from key 50. This driver identifier, e.g., "4", is not shared between keys 48, 50. That is, in this example, identifying information 51 of key 50 will include a different driver identifier, e.g., "5". On the basis of the driver identifier, passive anti-theft system 46 distinguishes between key 48 and key 50 and thus distinguishes between Driver A who normally uses key 48 and Driver B who normally uses key 50. As described below, if processor 14 is informed as to which driver is to drive vehicle 12, processor 14 can check to see if Driver A or Driver B has updated their respective configuration information and, if so, update system 10 with any updated configuration information.

If key 48 is inserted into key slot 52, passive anti-theft system 46 determines that key 48 is associated with a particular driver, e.g., Driver A, and may be used to start ignition system 44. If, instead, key 50 is inserted in key slot 52, passive anti-theft system 46 determines that key 50 is associated with a different particular driver, e.g., Driver B, and may be used to start ignition system 44.

If key 48 is inserted in key slot 52, passive anti-theft system 46 enables processor 14 such that Driver A will have use of processor 14 and access to data on processor 14 specific to Driver A. If, instead, key 50 is inserted in key slot 52, passive anti-theft system 46 enables processor 14 such that Driver B will have use of processor 14 and access to data on processor 14 specific to Driver B.

Identifying information 49, 51 need not be embedded with keys 48, 50. In some embodiments, identifying information 49, 51 may be provided by key fobs or other devices. In some embodiments, additional identifying information may be required prior to enabling ignition system 44 or processor 14. For example, a driver may need to input an additional identifying code via touch display 22.

FIG. 2 is an illustration of vehicle 12, remote location 54, and network 56. During assembly, processor 14 (FIG. 1) is loaded with factory set configuration information 53 which determines, inter alia, the appearance and functionality of display screen 22. Configuration information 53 is uploaded and stored at remote location 54 via network 56. In the example of FIG. 2, configuration information 53 specifies audio channels 1, 2, and 3, a red background, and three (3) buttons for display 22. Configuration information 53 also includes a part number for a component of vehicle 12, e.g., HVAC#: 35X71. As described below, this component information may be used to verify that requested configuration information is directed to an authorized vehicle.

FIG. 3 is an illustration of update terminal 57, remote location 54, and network 56. In the example of FIG. 3, Driver A accesses remote location 54 via network 56 and submits updated configuration information 58 including audio channel, background, and number of button information for display 22. Remote location 54 checks to see whether updated configuration information 58 complies with policy 60 regarding the number of buttons for display 22. In the example of FIG. 3, policy 60 permits a maximum of 5 buttons for display 22. If updated configuration information 58 violates policy 60, remote location 54 will modify updated configuration information 58 such that it complies with policy 60. In the example of FIG. 3, updated configuration information specifies audio channels 3, 5, and 7, a blue background, and twenty-five (25) buttons for display 22. Policy 60, however, limits the number of buttons to five (5). Remote location 54 will modify updated configuration information 58 such that it includes only five (5) buttons. Modified configuration information 62 will be stored at remote location 54 and returned to Driver A via network 56.

In alternative embodiments, remote location 54 may reject updated configuration information 58 if it does not comply with policy 60. As such, remote location 54 is able to control the configuration information associated with processor 14 and display 22.

Figure 4:
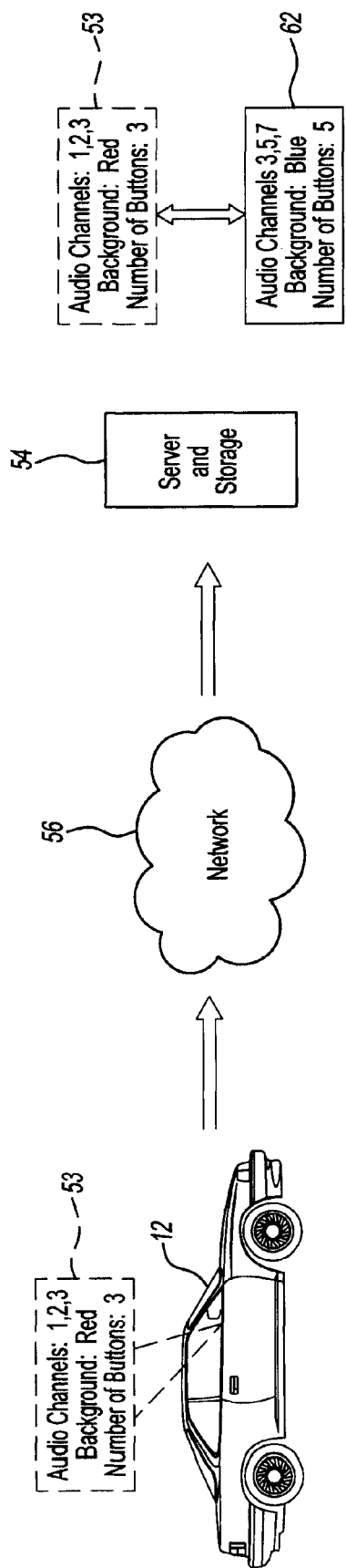
FIG. 4 is an illustration of the vehicle, network, and remote server of FIG. 2 and shows that at vehicle start-up, the vehicle and remote server cooperate to determine whether the remote server has updated configuration information.

FIG. 4 is an illustration of vehicle 12, remote location 54, and network 56. Upon the next authorized start-up of vehicle 12 by Driver A, following the process described with respect to FIG. 3, processor 14 will communicate with remote location 54, via wireless access point 34 (FIG. 1), through network 56 to determine whether factory installed configuration information 53 is to be updated. Processor 14 will request from remote location 54 an indicator as to whether the configuration information has changed, and, if so, processor 14 will download modified configuration information 62 and configure processor 14 and display 22 based on modified configuration information 62 during the use of vehicle 12 by Driver A.

In the absence of any update to configuration information 53 by Driver B, upon the next authorized start-up of vehicle 12 by Driver B, processor 14 will reconfigure processor 14 and display 22 based on configuration information 53 during the use of vehicle 12 by Driver B.

In some embodiments, prior to the download of updated configuration information, remote location 54 may request the part number of a vehicle component, e.g., HVAC#: 35X71, to confirm that the vehicle requesting the configuration information is authorized to do so. Remote location 54 may compare the received vehicle component number and compare it to that stored and uploaded by the factory. If the numbers match, remote location 54 may allow the download of any updated configuration information to occur. If the numbers do not match, remote location 54 may deny the request to download any updated configuration information.

In some embodiments, driver behavior may be used to determine whether to prevent access or disable some or all of the functionality of system 10. For example, speed sensor 42 may indicate that the vehicle speed exceeds all legal limits, e.g., 100 m.p.h., suggesting unauthorized use of vehicle 12. Under such circumstances, passive anti-theft system may disable some or all of the functionality of processor 14 to protect information residing in processor 14. It is contemplated that other techniques may be used to monitor driver behavior, e.g., frequency of stop and start, intensity of breaking or acceleration, etc.

Figure 5:
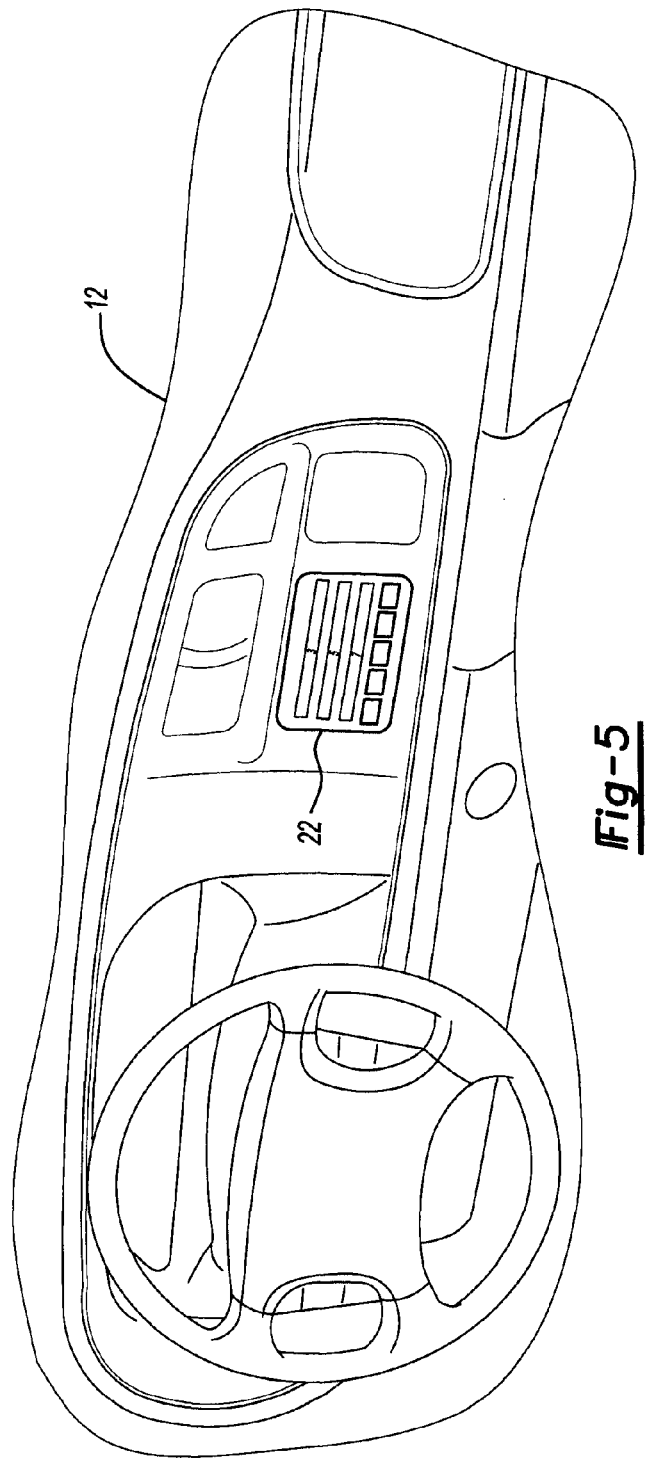
FIG. 5 is a perspective view of the dash panel of the vehicle of FIG. 1 and shows a monitor with the updated configuration information.

FIG. 5 is an perspective view of the dash panel of vehicle 12 and shows display 22 with modified configuration information 62, e.g., display unit 22 is shown with audio channels 3, 5, and 7 and five (5) buttons.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system to update first configuration information of a computing platform of a vehicle, the system comprising:
   an off-vehicle information store configured to receive and store second configuration information associated with a driver of the vehicle;
   a token associated with the driver configured to supply first identification information;
   an on-vehicle identification module configured to receive the first identification information and determine whether to enable the computing platform based on the first identification information;
   an on-vehicle communication module configured to establish a communication line between the computing platform and the information store if the computing platform is enabled; and an on-vehicle update module configured to determine whether the first configuration information is different from the second configuration information and update the computing platform with the second configuration information if the second configuration information is different from the first configuration information.

2. The system of claim 1 wherein the information store is further configured to determine whether the second configuration information complies with a predefined policy.

3. The system of claim 2 wherein the information store is further configured to reject the second configuration information if the second configuration information does not comply with the predefined policy.

4. The system of claim 2 wherein the information store is further configured to automatically modify the second configuration information, if the second configuration information does not comply with the predefined policy, such that it complies with the predefined policy.

5. The system of claim 1 wherein the information store is further configured to receive and store vehicle information identifying a component of the vehicle.

6. The system of claim 5 wherein the information store is further configured to determine whether to permit the update of the first configuration information based on the vehicle information.

7. The system of claim 1 wherein the identification module is further configured to receive second identification information from the driver and to determine whether to enable the computing platform based on the second identification information.

8. The system of claim 1 wherein the identification module is further configured to monitor driving behavior of the driver and to determine whether to prevent access to the computing platform, if enabled, based on the driving behavior.

9. The system of claim 1 wherein the vehicle further includes a starting mechanism, wherein the token is further configured to supply second identification information, and wherein the identification module is further configured to determine whether to enable the starting mechanism based on the second identification information.

10. A method for updating first configuration information of a computing platform of a vehicle, the method comprising:
    receiving, at an information store remote from the vehicle, second configuration information associated with a driver of the vehicle;
    storing, at the information store, the second configuration information;
    receiving, at the vehicle, first identification information from a token associated with the driver;
    determining whether to enable the computing platform based on the first identification information;
    establishing a communication line between the computing platform and the information store if the computing platform is enabled;
    determining whether the first configuration information is different from the second configuration information; and
    updating the computing platform with the second configuration information if the second configuration information is different from the first configuration information.

11. The method of claim 10 further comprising receiving second identification information from the driver and determining whether to enable the computing platform based on the second identification information.

12. The method of claim 10 further comprising determining, at the information store, whether the second configuration information complies with a predefined policy.

13. The method of claim 12 further comprising rejecting the second configuration information if the second configuration information does not comply with the predefined policy.

14. The method of claim 12 further comprising automatically modifying the second configuration information such that it complies with the predefined policy.

15. The method of claim 10 further comprising monitoring driving behavior of the driver and determining whether to prevent access to the processor, if enabled, based on the driving behavior.

16. The method of claim 10 further comprising receiving, at the information store, vehicle information identifying a component of the vehicle, and storing, at the information store, the vehicle information.

17. The method of claim 16 further comprising determining whether to permit an update to the processor based on the vehicle information.

18. The method of claim 10, wherein the vehicle includes a starting mechanism, further comprising receiving, at the vehicle, second identification information from the token associated with the driver and determining whether to enable the starting mechanism based on the second identification information.

* * * * *